United States Patent
Lund

(12) 
(10) Patent No.: US 6,370,137 B1
(45) Date of Patent: *Apr. 9, 2002

(54) METHOD AND APPARATUS FOR PROVIDING BROADBAND ACCESS CONFERENCING SERVICES

(75) Inventor: Arnold M. Lund, Louisville, CO (US)

(73) Assignee: Ameritech Corporation, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/366,031

(22) Filed: Aug. 2, 1999

Related U.S. Application Data

(63) Continuation of application No. 08/896,165, filed on Jul. 17, 1997, now Pat. No. 5,949,763.

(51) Int. Cl.[7] ............................................. H04Q 11/04
(52) U.S. Cl. ..................... 370/352; 370/261; 370/432; 370/468; 379/202
(58) Field of Search ................................ 370/260, 261, 370/264, 265, 270, 351, 352, 353, 354, 355, 356, 458, 460, 262, 263, 399, 432, 468; 379/201, 202, 205

(56) References Cited

U.S. PATENT DOCUMENTS

| | | | |
|---|---|---|---|
| 3,649,761 A | 3/1972 | Bush et al. | 179/2 TV |
| 3,711,648 A | 1/1973 | Whitney | 179/2 TV |
| 3,898,390 A | 8/1975 | Wells et al. | 79/41 |
| 3,922,491 A | 11/1975 | Björk et al. | 179/2 TV |
| 3,999,006 A | 12/1976 | Takeuchi et al. | 358/85 |
| 4,430,731 A | 2/1984 | Gimple et al. | 370/30 |
| 4,449,218 A | 5/1984 | Strehl | 370/69.1 |
| 4,512,013 A | 4/1985 | Nash et al. | 370/69 |
| 4,650,930 A | 3/1987 | Hogeboom et al. | 379/93 |
| 4,654,866 A | 3/1987 | Böttle et al. | 379/54 |
| 4,670,874 A | 6/1987 | Sato et al. | 370/110.1 |
| 4,769,833 A | 9/1988 | Farleigh et al. | 379/105 |

(List continued on next page.)

FOREIGN PATENT DOCUMENTS

| | | | |
|---|---|---|---|
| EP | 0 659 007 A3 | 6/1995 | H04M/11/06 |
| EP | 0 659 007 A2 | 6/1995 | H04M/11/06 |
| EP | 0 684 714 A2 | 11/1995 | H04L/12/28 |
| EP | 0 740 451 A1 | 10/1996 | H04M/11/06 |
| WO | WO 96/29814 | 9/1996 | H04M/11/00 |

OTHER PUBLICATIONS

Peter S. Chow and John M. Cioffi, "A Multi–Drop In–House ADSL Distribution Network", produced for conference in New Orleans, May 1–5, 1994, Serving Humanity Through Communications, dated May 1994, pp. 456–460.

Copy of co–pending U.S. Patent application Ser. No. 09/533,263, filed Mar. 17, 2000 claiming priority to Ser. No. 08/742,164 filed Nov. 1, 1996 and Ser. No. 09/119,094 filed Jul. 20, 1998 (file No. 8285/347).

*Primary Examiner*—Douglas Olms
*Assistant Examiner*—Shick Hom
(74) *Attorney, Agent, or Firm*—Brinks Hofer Gilson & Lione

(57) ABSTRACT

A method and apparatus for providing broadband conferencing services is provided. The method includes the steps of establishing a voice channel over a circuit switched telephone network and a virtual data channel over a packet data network between at least two parties. The apparatus includes a telephone line and a digital data line sharing a single subscriber loop in addition to a system for establishing a virtual data channel over a packet data network. Further, an advanced intelligent network telephone network having a first database of customer premise equipment and a second database having data addresses associated with the customer premise equipment is disclosed.

12 Claims, 7 Drawing Sheets

U.S. PATENT DOCUMENTS

| | | | | |
|---|---|---|---|---|
| 4,776,005 | A | 10/1988 | Petriccione et al. | 379/142 |
| 4,901,342 | A | 2/1990 | Jones | 379/93 |
| 5,042,062 | A | 8/1991 | Lee et al. | 379/54 |
| 5,054,055 | A | 10/1991 | Hanle et al. | 379/142 |
| 5,109,406 | A | 4/1992 | Mano et al. | 379/94 |
| 5,127,041 | A | 6/1992 | O'Sullivan | 379/59 |
| 5,184,345 | A | 2/1993 | Sahni | 370/54 |
| 5,214,650 | A | 5/1993 | Renner et al. | 370/110.1 |
| 5,220,599 | A | 6/1993 | Sasano et al. | 379/142 |
| 5,291,479 | A | 3/1994 | Vaziri et al. | 370/58.2 |
| 5,305,312 | A | 4/1994 | Fornek et al. | 370/62 |
| 5,317,630 | A | 5/1994 | Feinberg et al. | 379/94 |
| 5,329,308 | A | 7/1994 | Binns et al. | 348/14 |
| 5,349,638 | A | 9/1994 | Pitroda et al. | 379/142 |
| 5,353,334 | A | 10/1994 | O'Sullivan | 379/59 |
| 5,410,343 | A | 4/1995 | Coddington et al. | 348/7 |
| 5,425,090 | A | 6/1995 | Orriss | 379/201 |
| 5,428,608 | A | 6/1995 | Freeman et al. | 370/60.1 |
| 5,430,719 | A | 7/1995 | Weisser, Jr. | 370/58.2 |
| 5,438,568 | A | 8/1995 | Weisser, Jr. | 370/60 |
| 5,440,585 | A | 8/1995 | Partridge, III | 375/261 |
| 5,448,555 | A | 9/1995 | Bremer et al. | 370/20 |
| 5,448,635 | A | 9/1995 | Biehl et al. | 379/379 |
| 5,459,730 | A | 10/1995 | Bliven | 370/112 |
| 5,463,616 | A | 10/1995 | Kruse et al. | 370/24 |
| 5,467,385 | A | 11/1995 | Reuben et al. | 379/88 |
| 5,469,496 | A | 11/1995 | Emery et al. | 379/58 |
| 5,473,613 | A | 12/1995 | Bliven | 370/112 |
| 5,475,735 | A | 12/1995 | Williams et al. | 379/59 |
| 5,479,491 | A | 12/1995 | Garcia et al. | 379/88 |
| 5,479,495 | A | 12/1995 | Blumhardt | 379/207 |
| 5,499,290 | A | 3/1996 | Koster | 379/242 |
| 5,502,760 | A | 3/1996 | Gilbert et al. | 379/90 |
| 5,506,866 | A | 4/1996 | Bremer et al. | 375/216 |
| 5,511,075 | A | 4/1996 | Bhasker | 370/85.13 |
| 5,511,109 | A | 4/1996 | Hartley et al. | 379/40 |
| 5,517,562 | A | 5/1996 | McConnell | 379/207 |
| 5,519,731 | A | 5/1996 | Cioffi | 375/260 |
| 5,519,763 | A | 5/1996 | Namekawa et al. | 379/61 |
| 5,519,772 | A | 5/1996 | Akman et al. | 379/265 |
| 5,524,047 | A | 6/1996 | Brown et al. | 379/93 |
| 5,526,413 | A | 6/1996 | Cheston, III et al. | 379/201 |
| 5,528,281 | A | 6/1996 | Grady et al. | 348/7 |
| 5,528,285 | A | 6/1996 | Morikawa et al. | 348/14 |
| 5,528,666 | A | 6/1996 | Weigand et al. | 379/58 |
| 5,533,019 | A | 7/1996 | Jayapalan | 370/60.1 |
| 5,533,105 | A | 7/1996 | Brown et al. | 379/93 |
| 5,535,204 | A | 7/1996 | Li | 370/76 |
| 5,537,436 | A | 7/1996 | Bottoms et al. | 375/222 |
| 5,546,447 | A | 8/1996 | Skarbo et al. | 379/142 |
| 5,550,649 | A | 8/1996 | Wong et al. | 358/479 |
| 5,555,258 | A | 9/1996 | Snelling et al. | 370/29 |
| 5,563,938 | A | 10/1996 | Soshea et al. | 379/201 |
| 5,566,235 | A | 10/1996 | Hetz | 379/201 |
| 5,572,572 | A | 11/1996 | Kawan et al. | 379/98 |
| 5,572,583 | A | 11/1996 | Wheeler, Jr. et al. | 379/207 |
| 5,592,538 | A | 1/1997 | Kosowsky et al. | 379/88.13 |
| 5,598,456 | A | 1/1997 | Feinberg | 379/42 |
| 5,602,837 | A | 2/1997 | Takahashi | 370/280 |
| 5,603,095 | A | 2/1997 | Uola | 455/67.1 |
| 5,610,910 | A | 3/1997 | Focsaneanu et al. | 370/351 |
| 5,610,972 | A | 3/1997 | Emery et al. | 379/58 |
| 5,613,190 | A | 3/1997 | Hylton | 455/3.1 |
| 5,613,191 | A | 3/1997 | Hylton et al. | 455/3.1 |
| 5,630,204 | A | 5/1997 | Hylton et al. | 455/3.3 |
| 5,640,444 | A | 6/1997 | O'Sullivan | 379/59 |
| 5,644,629 | A | 7/1997 | Chow | 379/142 |
| 5,664,003 | A | 9/1997 | Foladare et al. | 455/459 |
| 5,761,292 | A | 6/1998 | Wagner et al. | 379/229 |
| 5,768,280 | A | 6/1998 | Way | 370/486 |
| 5,790,548 | A | 8/1998 | Sistanizadeh et al. | 370/401 |
| 5,793,498 | A | 8/1998 | Scholl et al. | 358/434 |
| 5,796,729 | A | 8/1998 | Greaney et al. | 370/345 |
| 5,825,777 | A | * 10/1998 | Komarek et al. | 370/458 |
| 5,842,111 | A | 11/1998 | Byers | 455/6.3 |
| 5,854,829 | A | 12/1998 | Hughes-Hartogs | 379/100.12 |
| 5,862,202 | A | 1/1999 | Bashoura et al. | 379/100.14 |
| 5,864,763 | A | 1/1999 | Leung et al. | 455/557 |
| 5,878,078 | A | 3/1999 | Griffin et al. | 375/222 |
| 5,889,774 | A | 3/1999 | Mirashrafi et al. | 370/352 |
| 5,889,856 | A | 3/1999 | O'Toole et al. | 379/399 |
| 5,892,591 | A | 4/1999 | Anglin, Jr. et al. | 358/407 |
| 5,892,764 | A | 4/1999 | Riemann et al. | 370/401 |
| 5,905,781 | A | 5/1999 | McHale et al. | 379/93.14 |
| 5,937,040 | A | 8/1999 | Wrede et al. | 379/93.23 |
| 5,943,404 | A | 8/1999 | Sansom et al. | 379/93.06 |
| 5,949,763 | A | * 9/1999 | Lund | 370/261 |
| 5,954,799 | A | * 9/1999 | Goheen et al. | 370/351 |
| 5,970,069 | A | 10/1999 | Kumar et al. | 370/402 |
| 5,991,292 | A | * 11/1999 | Focsaneanu et al. | 370/352 |
| 6,005,677 | A | 12/1999 | Suzuki | 358/442 |
| 6,005,873 | A | 12/1999 | Amit | 370/494 |
| 6,020,915 | A | 2/2000 | Bruno et al. | 348/15 |
| 6,028,867 | A | 2/2000 | Rawson et al. | 370/463 |
| 6,028,917 | A | 2/2000 | Creamer et al. | 379/100.01 |
| 6,044,107 | A | 3/2000 | Gatherer et al. | 375/222 |
| 6,049,531 | A | 4/2000 | Roy | 370/260 |
| 6,064,667 | A | 5/2000 | Gisby et al. | 370/352 |
| 6,069,879 | A | 5/2000 | Chatter | 370/295 |
| 6,141,339 | A | 10/2000 | Kaplan et al. | 370/352 |

* cited by examiner

METHOD AND APPARATUS FOR PROVIDING BROADBAND ACCESS CONFERENCING SERVICES

This application is a continuation of application Ser. No. 08/896,165, filed Jul. 17, 1997, now U.S. Pat. No. 5,949,763.

BACKGROUND OF THE INVENTION

The present invention relates to broadband conferencing services. More particularly, the present invention relates to a method and apparatus for providing voice and data services by coordinating standard telephone network and packet data network resources.

A majority of telephone service subscribers use analog Plain Old Telephone Services (POTS) when placing ordinary voice telephone calls. POTS is often delivered over a subscriber loop of copper wires installed between each subscriber and a local telephone company (telco) central office. The telco central office contains circuit switches that interconnect subscribers and establish call connections. Typically, a circuit connection is established for each telephone call and this connection is maintained for the duration of a call.

The increased use of computers in businesses and homes has lead to an increased load on standard telephone networks. Also, video telephone conferencing is becoming a more popular and utilized tool. Data and video often require large amounts of bandwidth that are not readily available over a standard telephone line. Subscribers wishing to hold a conversation with someone while simultaneously transmitting an associated video signal or other types of data are typically limited to using separate subscriber loops or a specialized software package that encodes the data on top of the voice information.

The use of separate subscriber loops is disadvantageous due to the expense of installing the extra subscriber loop wiring and switching capabilities in the network. Further, a subscriber would need to maintain records of the telephone number for the voice connection and the telephone number of the data connection. Each number would be dialed separately when a connection was desired.

A method of communicating both voice and data information over a single subscriber loop is described in U.S. Pat. No. 5,184,345. The disclosed method implements integrated services digital network (ISDN) facilities to carry both data and voice information over a circuit switched telephone network. Although the method used in U.S. Pat. No. 5,184,345 permits data and voice information over a single subscriber loop, the method is designed for end-to-end calls between the caller and called party only and does not support simultaneous voice and data to multiple parties. The disclosed ISDN embodiment requires that both the caller and called party have ISDN facilities. In addition, the voice and data communication paths are both established through dedicated circuits in the circuit switched telephone network and may impose a high demand on network resources.

Accordingly, there is a need for an improved system and method of communicating both voice and data information over a single subscriber loop, providing flexible and efficient use of existing infrastructure, reducing the load on circuit switched telephone network resources, and permitting multiple parties to participate in the same voice and data communication.

DETAILED DESCRIPTION OF PRESENTLY PREFERRED EMBODIMENTS

Figure 1:
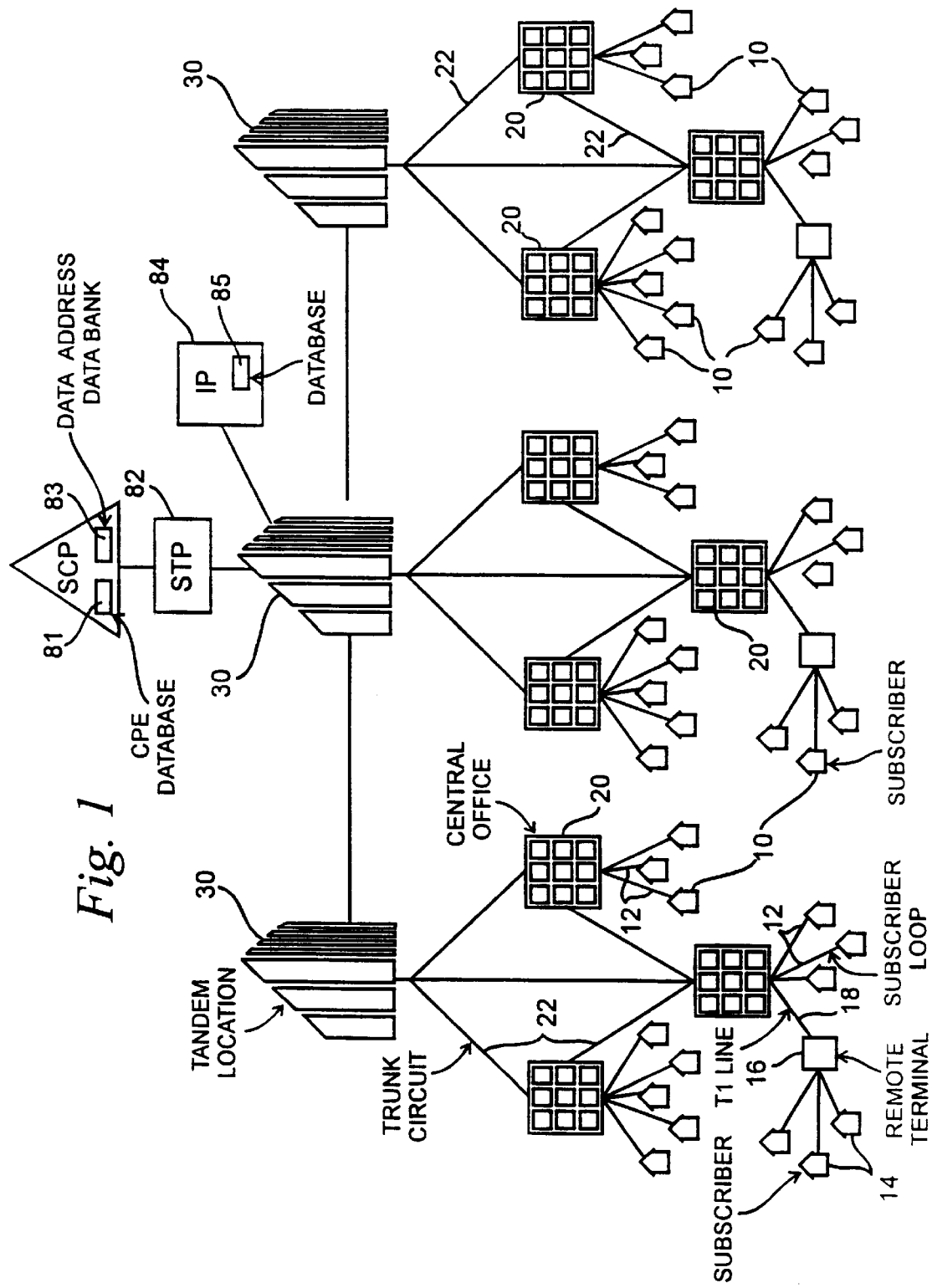
FIG. 1 is a block diagram of a telephone network system.

FIG. 1 shows a diagram of a telephone network. Telephone subscribers 10 are typically serviced by analog telephone lines carried to the central office 20 by a subscriber loop 12 including twisted pairs of copper wires. Groups of subscribers 14 may also be connected by subscriber loops to a remote terminal 16 which combines a number of subscribers onto a digital multiplexed data line 18 for transmission to the central office 20. One suitable digital multiplexed data line may be a 24-channel multiplexed T1 line.

Typically, a number of central offices 20 are connected by direct trunk circuits 22 or through tandem locations 30. The tandem locations 30 provide trunk circuits 22 to connect two central offices or other tandem locations 30. The tandem locations 30 can thus provide connections between central offices that do not have direct interconnecting trunks. It is to be understood that the telephone switching network may have multiple levels of tandem switching or other network topologies.

The central office 20, more commonly known as a service switching point (SSP), is a programmable switch having the ability to recognize advanced intelligent network (AIN) triggers for calls requiring special services. The central office 20 communicates with a service control point (SCP) 80. The SCP 80 is a network element containing logic and data necessary to provide the functionality required for the execution of a desired communications service. For example, the SCP 80 can contain call control service software that blocks certain numbers predetermined to be restricted to callers calling from a particular location. In this example, the call control service function would compare a dialed number with a list of restricted numbers to see if the call is permissible. An SCP 80 generally permits separation of service logic from switching functionality so that additional services may be developed without the need to alter the equipment or logic used in each individual central office 20. The SCP 80 preferably includes a customer premise equipment (CPE) database 81 and a data address database 83 that can cross reference the telephone number of a party originating a call and receiving a call with the type of CPE and data address of each party. A suitable SCP 80 is the AXE SCP manufactured by Ericsson Inc. The SCP 80 is preferably in communication with a central office 20 via a signal transfer point (STP) 82 and one or more switches such as a tandem switch 30. The STP 82 routes signals between different network elements. A suitable data signaling standard for use in a preferred embodiment of the present invention is the American National Standards Institute (ANSI) Signaling System No. 7 (SS7).

The SCP 80 may communicate with an intelligent peripheral 84 over a data path. The data path leads from the SCP 80 to the STP 82 over a data line utilizing SS7 standard protocol. The STP 82 then communicates with the central office 20 over another leg in the data path using the SS7 protocol. The central office 20 reformats the message from the SCP 80 from SS7 into an Integrated Services Digital Network (ISDN) standard message which is then forwarded over the final leg of the data path to the intelligent peripheral 84. The intelligent peripheral 84 may return messages along the same data path.

The intelligent peripheral 84 is an AIN network element that contains resources to exchange information with a telephone subscriber 10 and perform other functions such as call origination and tone generation. The intelligent peripheral 84 provides special resources for interactions between the telephone subscriber 10 and the network such as DTMF recognition, playing announcements and tone generation. In a preferred embodiment, an application using the database 85 in the intelligent peripheral 84 may be programmed with the necessary functionality to manage concurrent data and voice communications between multiple parties under the direction of the SCP 80. A services node/intelligent peripheral (SN/IP) platform is manufactured by Comverse Technology, Inc. that is suitable for use with a presently preferred system and method. A voice/information channel may also link the intelligent peripheral to a central office 20. Although the telephone network illustrated in FIG. 1 shows one network configuration, those of ordinary skill in the art will understand that the presently preferred method may be performed on more complex networks having a plurality of interconnected SCP's and intelligent peripheral's.

Figure 2:
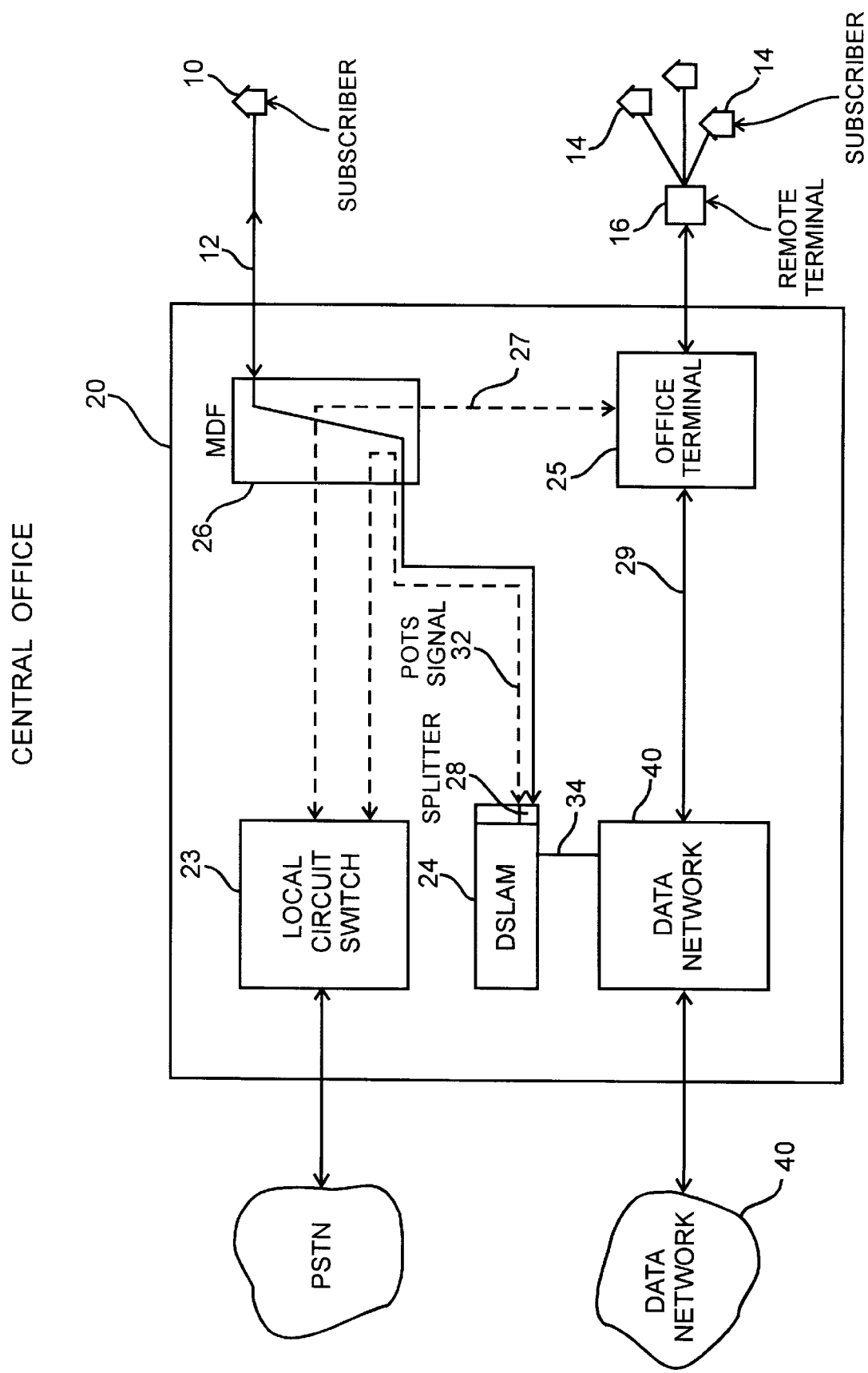
FIG. 2 is a diagram of the central office of the telephone network system of FIG. 1.

FIG. 2 shows a block diagram of the central office 20 of FIG. 1. The central office 20 preferably includes equipment to handle analog telephone lines such as conventional POTS. Conventional POTS is typically handled by a local telephone switching device 23. Suitable local telephone switching devices are Northern Telecom DMS-100 or ATT No. 5 ESS switches. Alternatively, an analog telephone line may also be provided by a Centrex type service or private branch exchange (PBX). As known to those skilled in the art, an analog telephone service may also be provided by a digital carrier system such as a T1 carrier or other type of concentrator.

In addition to providing POTS service, the central office may also be configured to provide a digital data line. For example, a digital data line may be implemented by a digital subscriber line access multiplexer (DSLAM) 24 to multiplex traffic from digital subscriber loops. Digital subscriber loops or digital carrier systems provided by a remote terminal 16 or an office terminal 25 provide digital data lines which enable subscribers 10 to transmit large amounts of digital multiplex data traffic over the POTS twisted pair telephone line. Preferably, the digital subscriber loop is an asymmetric digital subscriber line (ADSL). ADSL typically implements a digital subscriber line with a maximum data rate from the central office 20 to the subscriber 10 which is higher than the maximum available data rate from the subscriber 10 to the central office 20. For example, ADSL typically provides an asymmetric data rate of 1.5 megabytes-per-second (mbs) to the subscriber from the central office and about 400 kilabytes-per-second (kbs) from the subscriber location to the central office. Most preferably, ADSL implements an asynchronous transfer mode (ATM) data transmission protocol between the subscriber 10 and the central office 20. It will be recognized that other types of data transmission protocols, such as ISDN and Radish, may be utilized. Although these other protocols can be used to implement the present invention, the present invention is not dependent on any one protocol. In alternate embodiments, the digital data line may be provided by other types of digital carrier systems such as a Sonet based digital system.

Referring to FIG. 2, the subscriber loops pairs 12 carrying both analog voice and digital data traffic from subscribers 10 to the central office 20 terminate at a main distribution frame (MDF) 26. From the MDF 26, the subscriber loops 12 are connected to a means for separating POTS voice 32 frequencies from digital data traffic 34 such as a splitter 28. Preferably, the splitter 28 is implemented by the DSLAM 24. The internal operation of the splitter 28 is described in more detail below in connection with a splitter at the subscriber 10. The splitter 28 preferably has an output for POTS signals and another output for data traffic. From the splitter 28, the separated POTS voice signals 32 are connected back to the MDF 26 and onto the local switching device 23 handling POTS telephone calls. The data traffic output of the splitter 28 is directed to the DSLAM 24 to multiplex the digital data into a format suitable for transport on a data network 40. Depending on the data network 40, the DSLAM 24 may operate at higher bit rates such as those appropriate for Sonet OC-12. The data network 40 may be configured in different topologies and is preferably connected to a tandem location 30 to allow access to other central offices.

In the case of subscriber loops that are connected to the central office through a digital loop carrier system (i.e. a remote terminal 16 and an office terminal 25), the DSLAM 24 and its splitter 28 are preferably placed at the remote terminal 16. The data and voice signals are separated with a splitter 28 as described above. The voice signals are carried on digital loop carrier system to the office terminal 25 where they are connected through the MDF 26 to the local circuit switch 23. Preferably, the data signals are carried on a separate optical fiber or Sonet frame in the carrier system so that they can easily be separated from the voice signals in the office terminal 25. These signals are transmitted from the office terminal to the data network 40.

Figure 3:
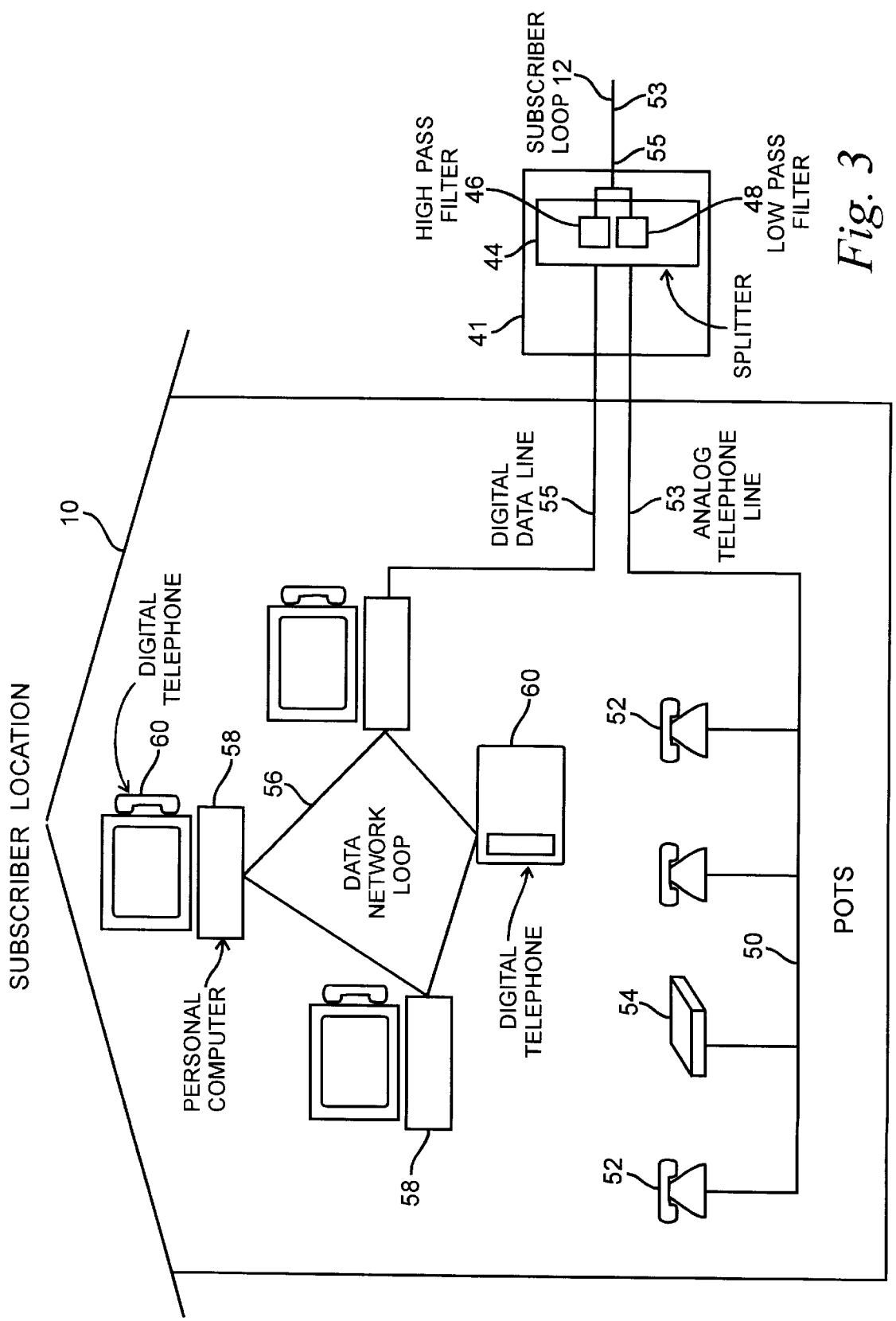
FIG. 3 is a diagram of a subscriber location in the telephone network system of FIG. 1.

FIG. 3 shows a diagram of a telephone subscriber location 10 such as a typical home or small office. A network interface device (NID) 41 connects the subscriber to the public switched telephone network (PSTN). The subscriber loop 12 between the subscriber 10 and the central office 20 is terminated at the NID 41. Customer premise equipment (CPE) 52, such as a standard telephone set, a key system, PBX, or a computer network to access the PSTN is connected at the NID 41. Voice signals from an analog telephone line 53 and data signals from a digital data line 55 are typically carried to the subscriber 10 on the same subscriber loop 12.

In the preferred embodiment of the invention, the NID 41 includes a means for separating voice frequency signals from data signals. Preferably, a splitter 44 separates voice frequency signals from the data traffic sharing the subscriber loop 12 wire pair. For example, to separate POTS from data traffic, the splitter 44 typically includes a high-pass filter 46 and a low-pass filter 48. To separate POTS voice signals, the low-pass filter 48 blocks high frequency signals, for example signals above 5 KHz, passing only lower voice frequency signals on a conventional CPE POTS loop 50. The voice signals on the CPE POTS loop 50 are connected to standard telephones 52 such as a Bell 103 set providing conventional POTS service. It should be noted that a conventional computer modem 54 can also utilize the conventional CPE POTS loop 50.

To recover data traffic, the high-pass filter 42 blocks low frequency signals, for example signals below 5 KHz, leaving only high frequency data traffic signals to be sent out on a separate CPE data network loop 56. The CPE data network loop 56 is connected to CPE equipped to access data traffic, for example, a network of personal computers. In one embodiment, the CPE data network 56 implements an asynchronous transfer mode network (ATM). Each of the personal computers 58 is equipped with an ATM network interface card (NIC) to allow the computer to access the CPE data network 56. The NIC 41 preferably also includes data segmentation and reassembly (SAR) capability to packetize data for transmission on the data network 56. Of course, other types of computer networks, such as an Ethernet network, may also be implemented.

Preferably, the CPE data network 56 is also equipped with one or more digital telephones 60 capable of interfacing the data network 56 to allow a subscriber to place a voice telephone call over the CPE data network 56. For example, a digital telephone 60 may be implemented with one of the personal computers 58 on the data network 56 by adding a telephone handset and an appropriate NIC with telephony functions. The telephone handset transmits and receives analog voice signals similar to a conventional handset. The computer/NIC provides SAR capability for converting analog voice to a digital packet stream for transmission over the CPE data network 56. The data network 56 also carries the basic telephony signaling functions. One such system capable of providing such a digital telephone is an ATM network based telephone system from Sphere Communications in Lake Bluff, Ill.

Using the CPE data network 56, the subscriber 10 can place a voice call using a telephone line derived from the digital data line. POTS service operates as a usual over the POTS wiring 50 to provide regular telephone service such as a telephone line carrying analog voice signals. In addition, the data network 56 with digital telephone 60 also has the capability to place voice telephone calls using one or more derived voice lines implemented through the data network.

Figure 4:
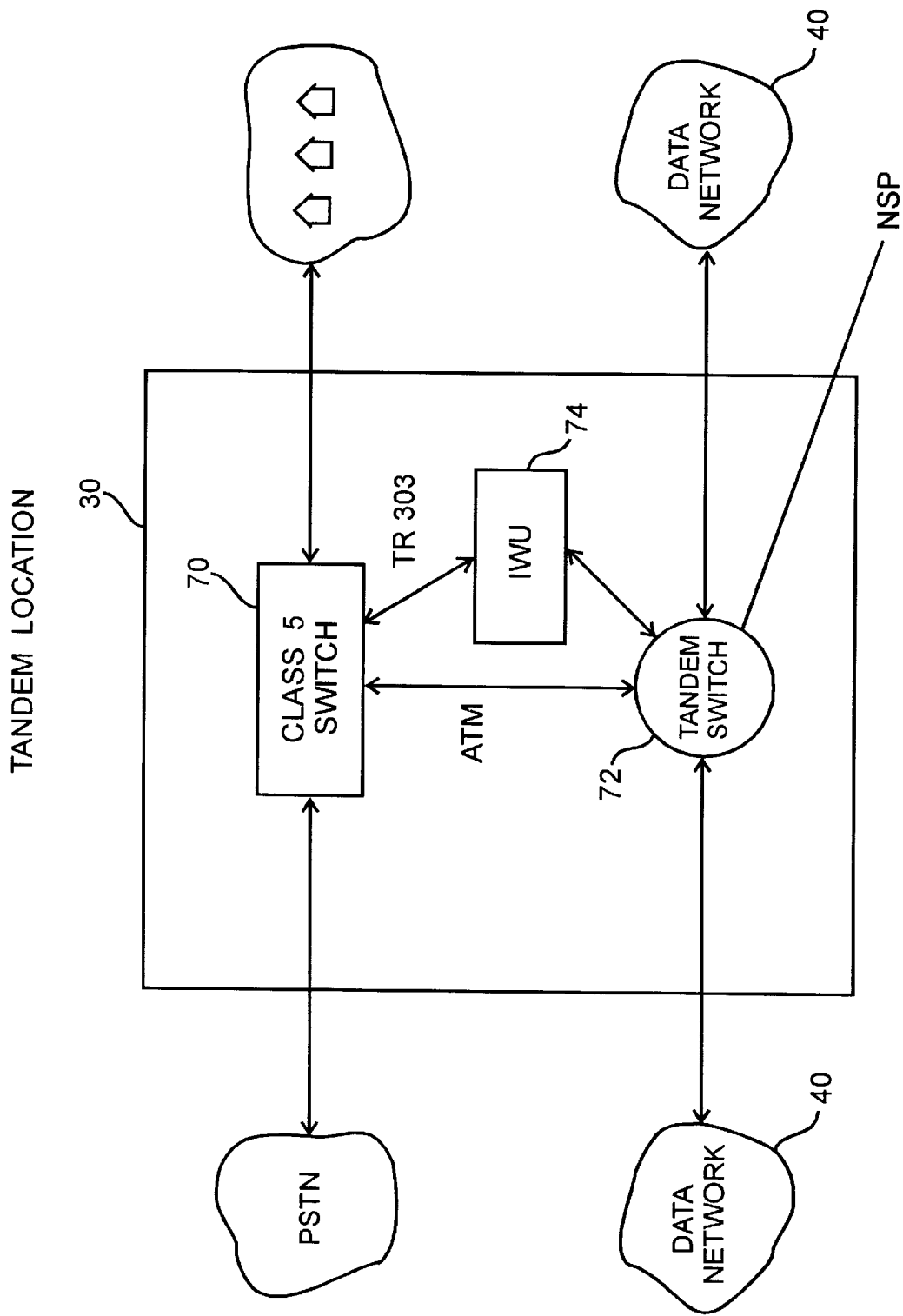
FIG. 4 is a diagram of the tandem location of the telephone network of FIG. 1.

FIG. 4 shows a block diagram of a tandem location which contains a tandem voice switch (not shown), a Class 5 local switch 70 and a means for providing access to digital data networks. The Class 5 local switch 70 typically connects local subscriber loops to the telephone network, while a separate tandem voice switch (not shown) provides conventional circuit-switched connections for directing POTS traffic between central offices 20 (FIG. 1) of the PSTN. Class 5 local switches such as the AT&T 5 ESS and the Nortel DMS 100, and tandem voice switches such as the AT&T 4 ESS and the Nortel-DMS 250 are known to those skilled in the art. In comparison, the means for providing data access to data networks is preferably a packet switch handling digital data traffic. For example, a data access tandem switch 72 provides access to data networks carrying digital data traffic. Preferably, the data networks 40 are equipped to accept ATM packet-switched connections. Although the internet is a preferred packet data network, other data networks 40 supporting packet data formats, such as intranets or corporate local area networks, may be used. The data access tandem switch 72 is an ATM fabric switch configured to provide virtual connections on demand between end users and providers of data networks and services. The data access tandem switch 72 may connect end users to various network service providers (NSPs) such as UUNet, MCI, Sprintnet, and AADS.

The tandem location 30 may also include a means to interface the data access tandem 72 and the Class 5 switch. For example, an interworking unit (IWU) 74 may implement an interface between the data access tandem switch 72 and the Class 5 switch 70 of the PSTN. The IWU 74 enables voice telephone calls carried by the data network 40 to access the PSTN through the Class 5 switch 70. The IWU 74 is capable of converting a voice telephone call in the data network protocol from the data access tandem switch 72 into the circuit-switch protocol of the Class 5 switch 70. Preferably, the IWU 74 interfaces an ATM packet data stream to a multiplexed circuit-switch protocol with dynamic allocation of voice channels such as TR-303.

Figure 5:
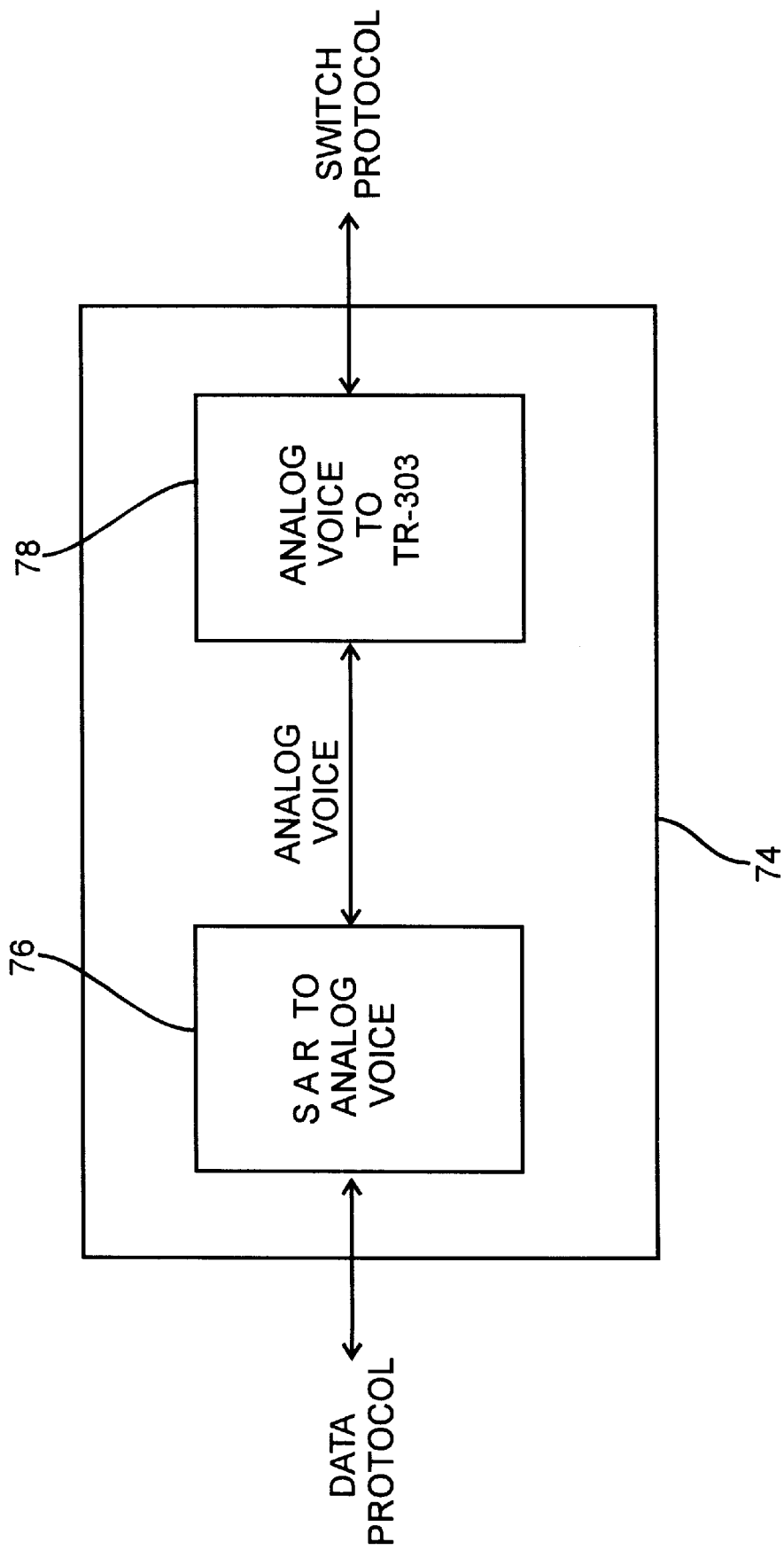
FIG. 5 is a block diagram of the interworking unit of FIG. 4.

For example, as seen in FIG. 5, the IWU 74 performs the SAR 76 of voice data from an ATM stream into an analog voice signal. The analog voice signal is then converted 78 into the TR-303 protocol, as known to those skilled in the art. More preferably, the IWU 74 converts the packetized ATM voice streams to a digital PCM format which is then converted to the desired TR-303 protocol. It should be noted that the local switch 70 may also be directly connected to a data access tandem 72 without the IWU interface 74. Newer generation digital switches may be capable of directly interfacing with the data transfer protocol of the data access tandem 72. For example, new generation circuit-switches may directly accept an ATM data stream for switching into the PSTN without the need for an IWU.

Figure 6:
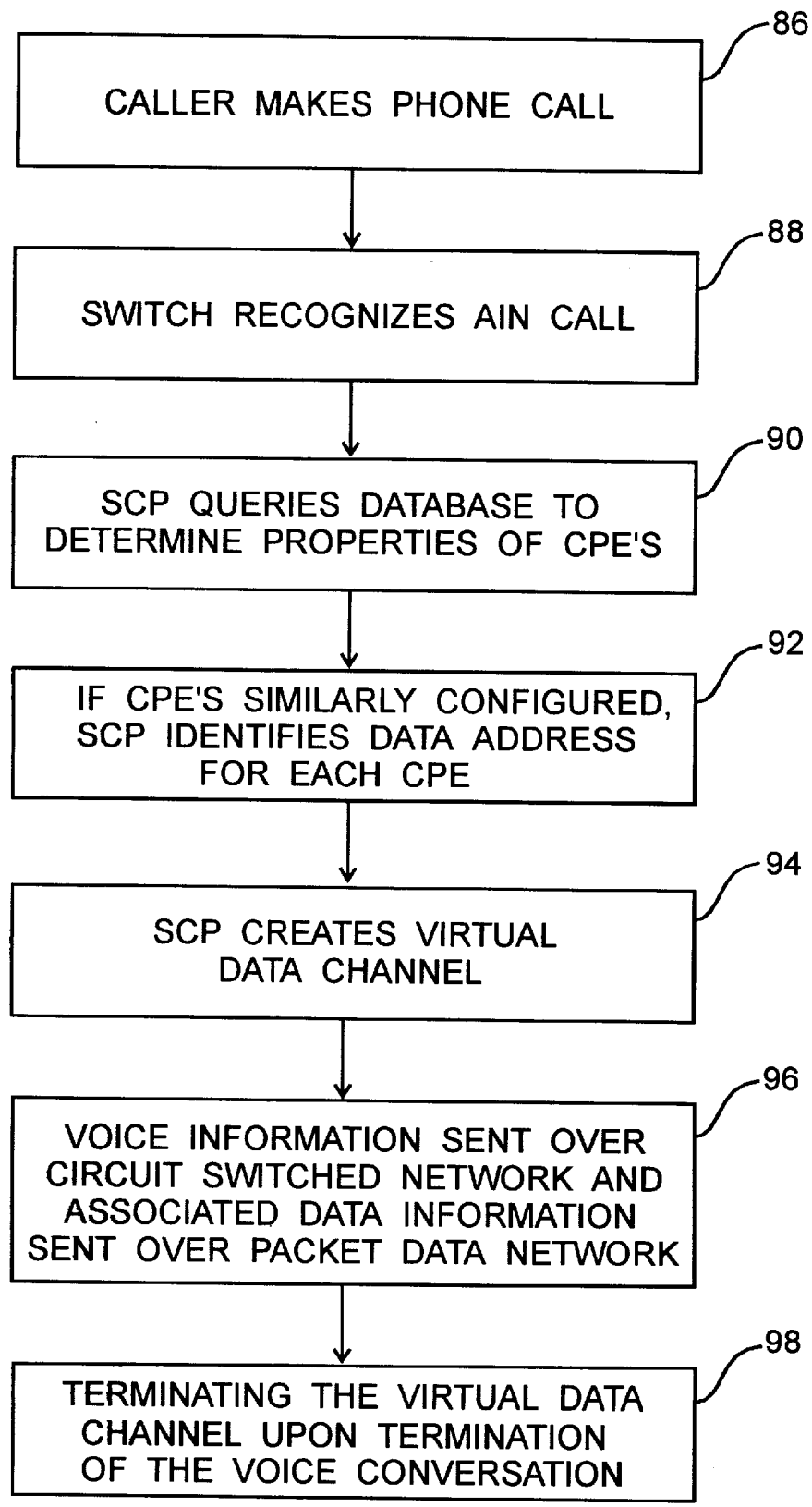
FIG. 6 is a flow diagram illustrating a method of implementing broadband access conferencing services using the telephone network system of FIG. 1.

Utilizing the above-described system, a method of implementing broad band access conferencing services may be accomplished as described below and shown in FIG. 6 A caller makes telephone call in order to reach another party, such as a business (at step 86). At the switch, the calling party's call creates an AIN trigger that alerts the SCP of the call (at step 88). The SCP makes a data base query to determine the properties of the calling parties CPE and the called party's CPE (at step 90). If the CPEs for caller and called party are similarly configured, for example both CPEs are capable of supporting ADSL broadband protocol, the addresses of the data interfaces at the caller CPE and called CPE are identified (at step 92). The data addresses may be Internet Protocol (IP) addresses of the data CPE at both locations. The system then automatically uses the data addresses of the two sides to set up a virtual data channel between the caller and the called party (at step 94) over a packet data network.

Preferably, the SCP looks up the IP addresses of the parties in a database and sends the appropriate address or addresses to the data CPE of each party at the beginning of the voice call. The database may be a local database 83 in the SCP or the database may be remotely located and accessible by the SCP. Each CPE would then store the received IP address until needed. Another preferred method of providing the IP addresses is for the SCP to periodically transmit the addresses to each party after the voice call is connected. Because the data connection is established after the voice conversation begins in this embodiment, the IP connections are not yet running in the CPE of the different parties to the communication at the beginning of a call. The SCP preferably places the IP addresses for all the parties into a memory buffer in the network such as within the SCP. Preferably, the applications running at each of the CPEs are preprogrammed to know where to find the memory buffer containing the IP addresses. A service provider supplying the telephone network capability allowing parallel circuit switched voice calling and packet data communications over a virtual data channel preferably utilizes a standard protocol compatible with application software running at the CPEs.

A CPE does not always need to look to a specific memory buffer in a network element, such as an SCP, to find IP addresses for other parties. Standard caller ID information associated with circuit switched voice telephone calls is usable by the CPE for each party to index a standard database containing IP addresses. An example of this is set forth below where the caller is an individual seeking consumer/repair information and the called party is a company customer service center. In this example, the caller can initiate a software application at the caller's CPE that would retrieve the IP address associated with the service center, in a data sharing session with an application running at the computer work station of a service representative with whom the caller is speaking over the circuit switched connection. The service representative's application may use the calling party's caller ID to index the IP address at the application supporting the network side of the service center's ADSL access line.

Referring again to FIG. 6, after providing the IP addresses to the parties and establishing the virtual data channel, data is transmitted between the caller and the called party over the virtual data channel created on a packetized data network 40 (at step 96). Upon termination of the voice call over the circuit switched network, the virtual data channel is terminated (at step 98). The switch connected to the calling party or the called party informs the SCP managing the call that the calling or called party has hung up in one preferred embodiment. The SCP then notifies the applications running in the CPE of the caller and called parties over the data channel that the call has been terminated. The applications then know to cease communicating.

The data transmission that takes place over the established virtual data channel on the packet data network may be in the form of real-time video so that the standard telephone call initially made by the caller results in a video telephone conversation. In this embodiment, both the caller and the called party would utilize video cameras connected to the personal computer 58 at their respective subscriber locations. Other types of video equipment and digital interface equipment capable of communication over a digital data line may be used. Alternatively, a simple one way transmission of data from one party to the other may be accomplished in parallel with a voice conversation. This data, such as a digitized photograph or a text file, can be manually sent between the parties at any time during the voice conversation.

In another embodiment, an interactive software application may be launched over the virtual data channel on the packet data network and shared between the two or more ends of the virtual data channel. One example of a software application is an internet web page for a company customer service center. In this example, a person calling to find out about a company's product dials a standard telephone number and, as set forth above, would establish a circuit switched voice connection and a virtual data channel. The IP addresses of both parties are passed to applications supporting the network side of the access lines and applications running in the CPE are able to retrieve the addresses to establish the virtual connection.

An advantage of the present system and method over systems requiring ISDN to transmit voice and data is that the present system and method does not require all parties in the network to possess special equipment. Unlike ISDN calls, which do not use packet data type protocols, the present method permits efficient use of packet data networks such as ADSL to synchronize voice and data transmission by simply dialing a standard telephone number. Using the packet data network in conjunction with the POTS network also enables multiple parties to conference in on both the voice and data communications. Multi-party conferencing is attained using ordinary voice call conferencing techniques in conjunction with the processes of distributing IP addresses described above.

Figure 7:
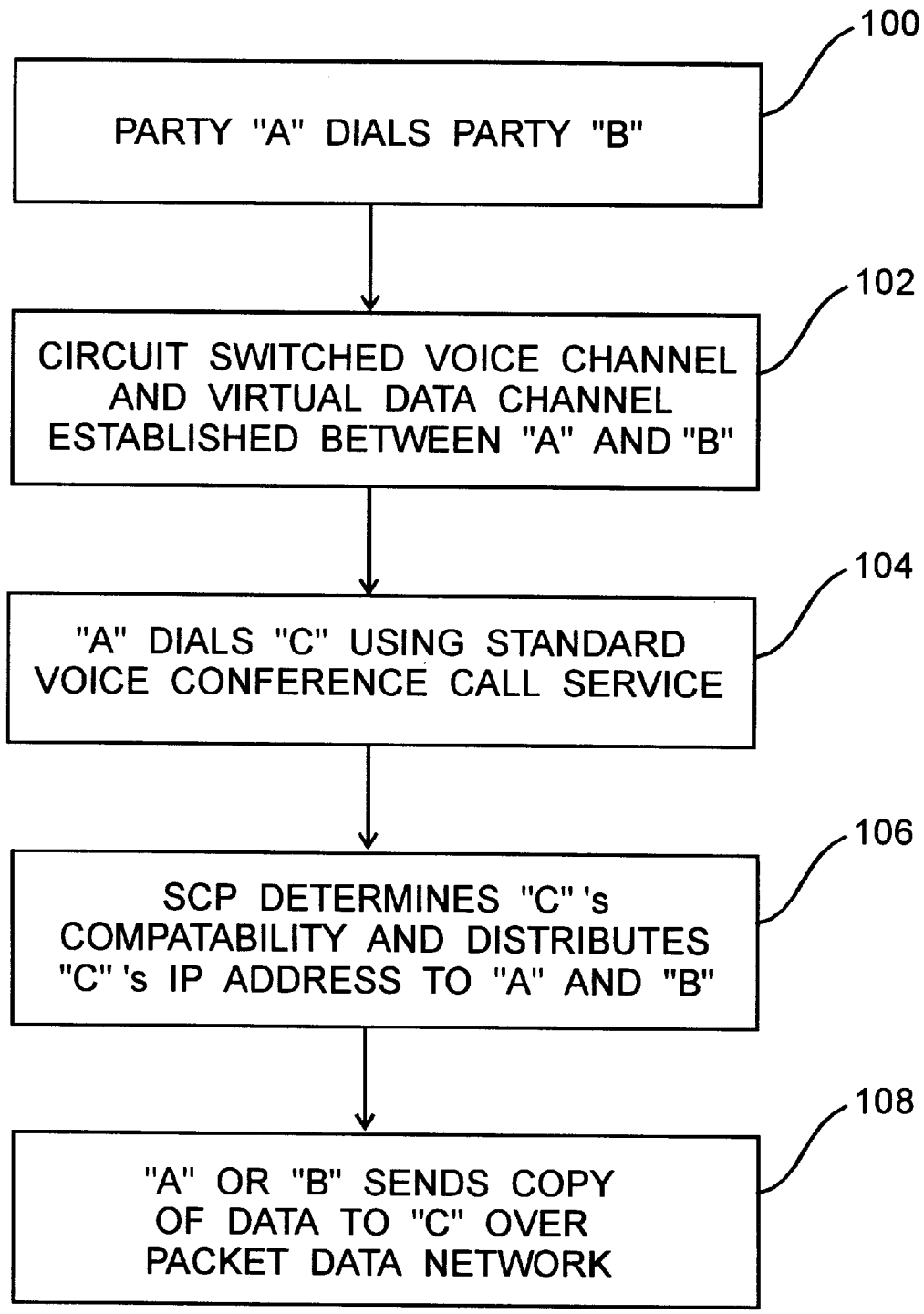
FIG. 7 is a flow diagram illustrating a method of establishing a broadband conference call for multiple parties using the method of FIG. 6 and the telephone network system of FIG. 1.

One preferred embodiment of a method for establishing a voice and data conference call is shown in FIG. 7. Party A, desiring to set up a voice and data conference call with parties B and C, initiates the conference call by first dialing party B (at step 100). The SCP distributes IP addresses for the two parties as set forth above (at step 102). Party A next initiates a call to party C using standard voice conference call services and adds party C to the call (at step 104). The application in the SCP identifies that party C is properly equipped for a data connection and distributes party C's data address to both A and B (at step 106). The SCP also provides party C with the IP addresses for A and B. An application in A or B would then use the receipt of C's IP address as a trigger to send a copy of the screen (data) being shared by A and B to C's display (at step 108). Once the circuit switched voice channels and virtual data channels between the parties have been established, a three way voice and data conference call may commence. Additional parties may be added to this broadband conference call by any of the current parties to the call using the method described above.

The preferred method and apparatus for enabling broadband conferencing using a combination of circuit switched voice calls and associated packet data network data channels provides flexibility in adapting existing infrastructure to accommodate enhanced capabilities. Rather than having to create an entirely new communications application, such as a multi-media conferencing exclusively communicated over the internet, some of the functionality already existing on an analog telephone network having AIN capability may be used. Thus, broadband access conferencing services can be introduced without the need for every subscriber of network provider to have special equipment. Subscribers can choose to delay upgrading their CPEs until they are ready and still participate in the voice portion of communications between one or several other subscribers having CPEs upgraded for voice and data communication.

As has been described above, by using emerging broadband access technology such as ADSL a conferencing service can be created that supplements an ordinary telephone call by automatically providing a second, virtual communication path between two or more parties. The preferred method can support a video conferencing service wherein the voice communication is carried on over a traditional telephone network and the video associated with the voice is transmitted over the internet. Other applications of the present method and system are a screen sharing service wherein a company and a caller are simultaneously looking at a page in a catalog while discussing the page over the telephone call. Additionally, an interactive voice response service may be initiated with the present system and method wherein a caller can use an ordinary telephone line to interact with a series of prompts and choices resulting in changes on the video screen. For instance, different web pages may be sent to the callers computer or a multipoint game with voice conferencing may be implemented. The present system and method also has the advantage of allowing telephone companies to leverage the functionality of an embedded base of systems, for example AIN, to more quickly and inexpensively offer new and enhanced services using new technologies such as ADSL.

It is intended that the foregoing detailed description be regarded as illustrative rather than limiting, and that it be understood that the following claims, including all equivalents, are intended to define the scope of this invention.

I claim:

1. A method of providing a broadband conferencing service comprising:

receiving a telephone call from a calling party at a telephony network;

establishing a voice channel over the telephony network between a called party and the calling party;

automatically establishing a virtual data channel between the called party and the calling party on a packet data network, wherein the voice channel and the virtual data channel operate in parallel to provide a synchronized voice and data transmission between the calling party and the called party; and transmitting video signals over the virtual data channel in parallel with transmitting a voice conversation over the voice channel.

2. A method of providing a broadband conferencing service comprising:

receiving a telephone call from a calling party at a telephony network;

establishing a voice channel over the telephony network between a called party and the calling party;

automatically establishing a virtual data channel between the called party and a calling party on a packet data network, wherein the voice channel and the virtual data channel operate in parallel to provide a synchronized voice and data transmission between the calling party and the called party; and wherein automatically establishing the virtual data channel further comprises establishing the virtual data channel between the calling party and the called party if a configuration of customer premise equipment CPE for the calling party is compatible with a configuration of CPE for the called party by interrogating a database having configuration information for both the calling party's and called party's CPE.

3. The method of claim 2, further comprising launching an application over the virtual data channel between the calling party and the called party, the application capable of interacting with both the calling and called parties.

4. The method of claim 2, wherein interrogating the database having configuration information comprises accessing a service control point SCP in an advanced intelligent network and wherein the database is located at the SCP.

5. The method of claim 2, further comprising establishing the voice channel and the virtual data channel with at least one additional party, wherein the voice channel is established over the telephony network and the virtual data channel is established over the data network.

6. A method of providing broadband access services allowing a voice and data communication between at least two parties comprising the steps of:

receiving a telephone call from a calling party over a subscriber loop in communication with a telephony network;

determining a data address for the calling party on a data network and a data address for a called party on the data network;

establishing a voice channel over the telephony network via the subscriber loop; and establishing a virtual data channel between the calling party and the called party over the data network via the subscriber loop, wherein the voice channel and the virtual data channel concurrently operate over the subscriber loop, and wherein the data addresses for the called party and the calling party are determined by a service control point SCP looking up data addresses associated with the telephone numbers of the called and calling party in a database.

7. The method of claim 6, wherein the data addresses are internet protocol IP addresses.

8. The method of claim 7, further comprising the step of the calling party transmitting data over the virtual data channel using an asynchronous transfer mode ATM transmission protocol.

9. The method of claim 6, further comprising adding an additional party to the voice and data communication between the calling party and the called party.

10. The method of claim 9, wherein adding the additional party comprises:

connecting the additional party to the virtual data channel by transmitting the data address for the additional party to each of the calling and called parties and transmitting the data addresses of the calling and called parties to the additional party, wherein all parties share information over the virtual data channel concurrently with communications over the voice channel.

11. A system for supporting broadband access services comprising:

a telephone line and a digital data line sharing a subscriber loop; and a telephone network in communication with the subscriber loop, the telephone network comprising:

a telephone network element having a list of telephone numbers and a list of data addresses associated with the list of telephone numbers; and means for establishing a virtual data channel between customer premise equipment CPE of at least two parties over a packet data network, the means for establishing the virtual data channel in communication with the telephone network element and responsive to voice calls received at the telephone network.

12. The system of claim 11, wherein the digital data line is an asymmetric digital subscriber line ADSL.

* * * * *